Figure 1:
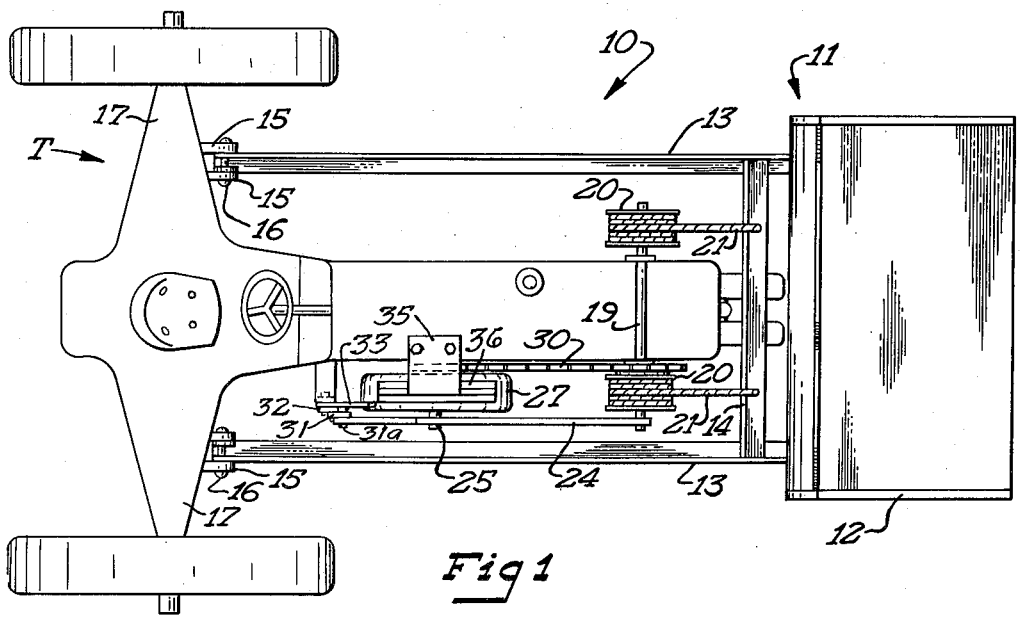

July 10, 1962 R. H. ANDERSON 3,043,457
POWER DRIVEN WINDING APPARATUS
Filed Dec. 9, 1960

INVENTOR.
RUSSELL H. ANDERSON
BY Williamson &
Palmatier
ATTORNEYS 3,043,457
POWER DRIVEN WINDING APPARATUS
Russell H. Anderson, Clinton, Minn.
Filed Dec. 9, 1960, Ser. No. 74,958
2 Claims. (Cl. 214—131)

This invention relates to winding apparatus and more particularly to power driven winding apparatus.

An object of this invention is to provide a novel power driven winding apparatus, of simple and inexpensive construction and operation, being especially adaptable for use in pulling loads.

Another object of this invention is to provide a novel and improved power driven winding apparatus including a winding mechanism driven by a friction drive mechanism arranged and constructed to be readily disengaged from driving relation with the winding mechanism.

A further object of this invention is to provide a novel and improved power driven winding apparatus including a friction drive mechanism drivingly connected to the winding mechanism, the drive mechanism comprising drive and driven rotary members arranged and constructed to be moved into and out of peripheral engagement with each other to permit the winding mechanism to be selectively driven.

A still further object of this invention is to provide a novel and improved power driven winding apparatus readily adaptable for use in providing motive power for tractor-mounted front end loaders and the like.

Figure 2:
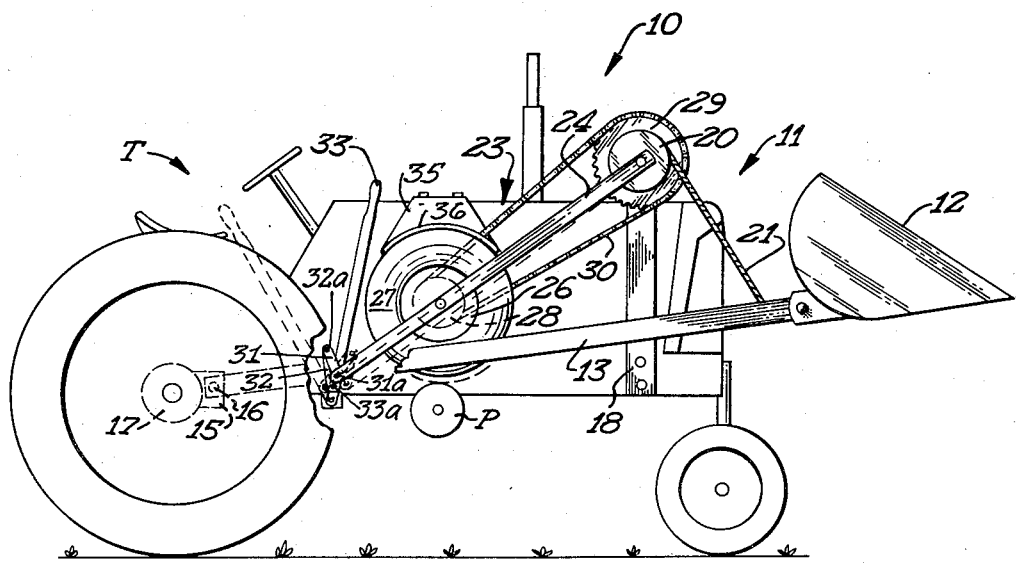

These and other objects and advantages of my invention will more fully appear from the following description made in connection with the accompanying drawings, wherein like reference characters refer to similar parts throughout the several views and in which:

FIG. 1 is a top plan view of my invention shown mounted in cooperative relation on a conventional tractor; and FIG. 2 is a side elevational view of my invention as illustrated in FIG. 1.

Referring now to the drawings it will be seen that one embodiment of my invention is shown mounted in cooperative relation on a tractor T and includes a power driven winding appartus 10 for use in supplying motive power in raising a front end loader 11. Tractor T of the conventional type and is provided with a laterally extending rotary power take-off drive pulley P, as best seen in FIG. 2. The front end loader 11 includes a scoop 12 which is positioned forwardly of the front end of the tractor and this scoop 12 is carried by the forward terminal portions of a pair of booms 13, each being positioned adjacent one side of the tractor and spaced laterally therefrom and extending rearwardly for attachment to the tractor rear axle housing.

It will be noted that the rear terminal portions of the booms are each positioned between a pair of forwardly projecting ears 15 and are pivotally connected thereto by means of a pivot pin 16, the ears being rigidly connected to the rear axle housing 17.

Again referring to FIG. 1 it will be seen that the forward terminal portions of the boom just rearwardly of the scoop 12 are interconnected by a transverse brace 14 which provides lateral bracing for the front end loader.

The power driven winding apparatus 10 includes a pair of elongate, upstanding frame members 18 attached to the front end portion of the tractor on both sides thereof by means of bolts or the like. An elongate axle 19 extends between and is journaled for rotation on the frame members 18 and it will be noted in FIG. 1 that the axle 19 projects laterally outwardly beyond each of the frame members 18. The outer terminal portions of the axle 19 have a pair of reels 20 mounted thereon for rotation therewith and these reels 20 each have an elongate flexible rope or cable 21 attached thereto and wound thereupon. The other end of each of the ropes or cables 21 is attached to the transverse brace 14 so that rotation of the axle 19 in a direction to cause the ropes 21 to be wound upon their respective reels will cause the front end loader 11 to be raised.

To this end a drive mechanism is provided for imparting rotative movement to the axle 19 and this drive mechanism 23 includes an elongate, rearwardly extending arm 24 having one end journaled for rotation about the terminal portion of the axle 19 on the right side thereof as viewed in FIG. 1.

It will be noted that the arm 24 extends downwardly and rearwardly from its pivotal connection on the axle 19 and is provided with a laterally projecting pin 25 intermediate its ends. This pin 25 has a wheel 26 mounted thereon for rotation relative thereto and wheel 26 is provided with a conventional pneumatic tire 27 mounted around the periphery thereof. Actually the tire-mounted wheel 26 is of the convential vehicle type and has a relatively small sprocket 28 connected thereto for rotation therewith. A larger sprocket 29 as best seen in FIG. 2, is keyed to the axle 19 for rotation therewith and the larger sprocket 29 is drivingly connected with the smaller sprocket 28 by an endless drive chain 30. Thus it will be seen that when the small sprocket 28 is rotated, the larger sprocket 29 will also be rotated through the action of drive chain 30 which will impart rotative movement of the axle 19.

Referring again to FIG. 2 it will be seen that the wheel-mounted tire 27 is positioned closely adjacent the power take-off drive pulley P and is adapted to be moved into and out of engagement therewith upon shifting of the shiftable arm 24.

Means are provided for causing shifting movement of the arm 24 and this means for shifting the arm includes a link 31 pivotally attached to the arm 24 as at 31a for relative pivotal movement therebetween. This link 31 is pivotally connected at its other end to a second link 32 at 32a. An upright, elongate actuating lever 33 is mounted adjacent its lower end to the tractor for pivotal or oscillating movement relative thereto between the full line position and the dotted line position illustrated in FIG. 2. The actuating lever 33 is pivotally connected intermediate its ends to link 32 by means of pivot pin 33a. The linkage 31 and 32 actually constitute a rear supporting means for the arm 24 and it will be noted that movement of the actuating lever to the full line position as illustrated in FIG. 2 will cause a lifting effect of the wheel 26 because of the shifting action of arm 24. This upward movement of the wheel 26 causes the tire 27 to be moved out of peripheral engagement with the drive pulley P so that the wheel and tire will not be driven. Movement of the lever 33 to the dotted line position in FIG. 2 causes the rear end portion of the arm to be moved downwardly by shifting action of the linkage 31 and 32 which causes pivotal movement of the arm 24 about its front end pivotal mounting so that the tire 27 is moved into peripheral engagement with the drive pulley P. When the linkage 31 and 32 are in the full line position, the relative positions of the pivot points and disposition of the links describes an over-center locking action so that the links 31 and 32 will be maintained in this position unless the lever 33 is positively shifted.

When positioned into driving engagement with the drive pulley P, the tire and wheel will be rotated, causing rotation of the small sprocket 28. Rotation of the sprocket 28, of course, acts through the endless chain 30 for rotating the larger sprocket 29 and axle 19. The flexible ropes 21 then will be wound upon their respective reels for raising the front end loader 11.

The front end loader 11, because of its inherently heavy construction, will be lowered by action of gravity and means are provided for retaining the front end loader in a raised position when the driven wheel 26 is moved out of engagement with the drive pulley P. This retaining or braking means for maintaining the front end loader in a raised position, includes a bracket 35 fixedly mounted to the tractor casing and on which is carried an arcuate brake shoe element 36 thereon as best seen in FIG. 2. Thus it will be seen that forward movement of the lever 33 will cause the wheel and tire to be disengaged from the drive pulley P and that further forward movement of the lever 33 will cause the brake shoe element 36 to frictionally engage the tire 27 for maintaining the loader 11 in a raised condition.

It has been found that with my novel winding mechanism a relatively simple front end loader may be utilized with tractors without resorting to the expensive installation of the hydraulic drive systems employed by a number of conventional tractors. It will also be noted that the reels may be utilized for pulling other loads and may be utilized as a power driven winding apparatus for winding fence wire thereupon.

A power driven winding apparatus may also be employed as a winch for pulling vehicles, boats or the like.

It will therefore be seen from the foregoing description that I have provided a novel power driven winding apparatus which is readily adaptable for use with conventional tractors and which may be employed as a motive power means for front end loaders, winches and the like.

It will also be noted from the preceding paragraphs, that I have provided a novel, power driven winding apparatus which is not only of simple and inexpensive construction but which may be employed for multifunctional purposes.

Thus, it will be seen that I have provided a novel power driven winding apparatus which functions in a more efficient manner than any heretofore known comparable device.

What is claimed is:

1. Power driven winding apparatus for use with a tractor of the type having a power take-off drive pulley, said apparatus comprising a support structure adapted to be fixedly connected to the front portion of a tractor in upstanding relation therewith, an elongate axle mounted on the upper end portion of said support structure for rotation about an axis extending transversely of the tractor and having a reel secured thereto for rotation therewith, a driven sprocket keyed to said axle for rotation therewith, an elongate flexible element having one end thereof attached to said reel and wound thereupon, an elongate support arm having one end thereof journaled for rotation about said axle and extending downwardly and rearwardly therefrom, a driven member rotatably mounted intermediate the ends of said arm for rotation relative thereto and being shiftable therewith, said driven rotary member comprising a wheel having a tire mounted thereon and being shiftable so that the peripheral surface of said tire is moved into and out of engagement with the power take-off pulley of the tractor when the shiftable arm is pivoted about its axis of pivot, a drive sprocket interconnected to said driven rotary member for rotation therewith, an endless drive chain trained around said drive sprocket and said driven sprocket for rotating the latter to thereby cause the flexible element to be wound upon the reel, and brake means mounted on said tractor and being selectively engageable with said tire to prevent unwinding of the flexible element when the same is attached to a load.

2. Drive mechanism for front end loader having a pair of boom supports mounted on a tractor of the type having a laterally disposed power take-off drive pulley, said drive mechanism including a pair of spaced-apart supports adapted to be fixedly connected to opposite sides of a tractor adjacent the front end portion thereof in upstanding relation therewith, an elongate axle having opposite ends thereof journaled for rotation on the upper ends of said supports and having a driven sprocket keyed thereto, a pair of reels fixedly mounted on said axle adjacent the terminal portions thereof, a pair of elongate flexible elements each having one end thereof secured to one of said reels and having the other end thereof adapted to be attached to one of the loader booms, an elongate arm having one end thereof journaled for rotation about said axle and extending rearwardly and downwardly therefrom for pivotal movement relative thereto, a wheel mounted on said arm intermediate the ends thereof for rotation relative thereto and having a tire mounted thereon, said wheel-mounted tire being positioned closely adjacent the power take-off drive pulley of the tractor when said mechanism is mounted on the latter, a drive sprocket interconnected with said wheel for rotation therewith, an endless drive chain trained around said drive and driven sprockets, and said arm when pivoted causing the circumferential surface of the tire to be moved into and out of engagement with the drive pulley to thereby cause the flexible element to be wound upon said reels for elevating the front end loader boom.

References Cited in the file of this patent
UNITED STATES PATENTS 2,334,010   Jones et al. _____ Nov. 9, 1943
2,679,942   Rumpel et al. _____ June 1, 1954